United States Patent [19]
Wannagot et al.

[11] Patent Number: 5,703,354
[45] Date of Patent: Dec. 30, 1997

[54] BINOCULAR NIGHT VISION DEVICE AND METHOD OF MAKING AND USING THE DEVICE

[75] Inventors: Gary A. Wannagot, Mesa; Curtis Brent Keepers; Timothy R. Goebel, both of Tempe; James M. Cwiakala, Jr., Chandler; Clifford J. Connors, Tempe, all of Ariz.

[73] Assignee: Litton Systems, Inc., Woodland Hills,, Calif.

[21] Appl. No.: 607,947

[22] Filed: Feb. 28, 1996

[51] Int. Cl.⁶ ............................................... G02B 23/00
[52] U.S. Cl. .......................... 250/214 VT; 359/409; 359/411
[58] Field of Search .................... 250/214 VT; 359/409, 359/410, 411, 412, 413

[56] References Cited

U.S. PATENT DOCUMENTS

| | | | |
|---|---|---|---|
| 4,449,787 | 5/1984 | Burbo et al. | 350/538 |
| 4,463,252 | 7/1984 | Brennan et al. | 250/213 |
| 5,130,527 | 7/1992 | Gramer et al. | 250/213 |
| 5,331,459 | 7/1994 | Dor | 359/409 |
| 5,495,364 | 2/1996 | Palmer | 359/412 |
| 5,535,053 | 7/1996 | Baril et al. | 359/409 |

*Primary Examiner*—Edward P. Westin
*Assistant Examiner*—Kevin Pyo
*Attorney, Agent, or Firm*—Oppenheimer, Poms, Smith

[57] ABSTRACT

A binocular night vision device (BNVD) includes a pair of night vision monocular scopes which pivotally and adjustably depend from a central housing portion. The central housing portion and the two night vision monocular scopes cooperatively define a singular gas envelope, which allows the entire BNVD to be purged of moist air and back filled with dry nitrogen gas to prevent fogging while requiring only a single purging port. Further, the central housing portion contains a single battery and a single voltage step up circuit powering both image intensifier tube modules of the two monocular night vision scopes. In order to provide for interpupillary distance adjustment, the central housing portion and each of the monocular night vision scopes defines a sealed pivot mechanism which also allows for electrical connection between the central housing portion and each of the night vision scopes.

21 Claims, 5 Drawing Sheets

BINOCULAR NIGHT VISION DEVICE AND METHOD OF MAKING AND USING THE DEVICE

RECOGNITION OF GOVERNMENT LICENSE

The U.S. government has rights in this invention pursuant to Contract No. N00164-94-D-0035, issued by the U.S. Navy, Naval Surface Warfare Center, Crane, Ind.

FIELD OF THE INVENTION

The present invention relates to a binocular night vision device. More particularly, the present invention relates to a binocular night vision device somewhat similar to the conventional ANVIS (aviator's night vision imaging system) type device. Both the present device and the ANVIS device include a pair of monocular night vision scopes which are mounted and associated with one another in such a way as to provide the user of the device with binocular vision, thereby allowing the user to enjoy a night-time view with depth perception. The BNVD according to the present invention includes a unitary housing having a unitary chamber enclosing a power supply, a pair of image intensifier tubes with associated objective and eyepiece optics, structure to allow monocular portions of the device to sealingly pivot relative to a central housing portion to adjust interpupillary distance.

Related Technology

A conventional binocular ANVIS night vision device is depicted in U.S. Pat. No. 4,449,787, issued 22 May 1984, to James Burbo, et al, (the '787 patent) in which a pair of monocular night vision scopes are carried upon a mounting assembly. The mounting assembly provides for disposing the pair of monocular scopes in front of the eyes of a user to provide binocular night vision. This mounting assembly provides for vertical adjustment of the monocular night vision scopes, as well as their adjustment for eye relief, and symmetrical interpupillary distance of the user.

A deficiency of the night vision device taught by Burbo in the '787 patent is that the user of the device must symmetrically adjust the monocular night vision scopes to provide a proper interpupillary distance so that the user enjoys binocular vision and depth perception. Unfortunately, the helmet or face plate which carries the night vision device may not naturally set on the user's head centered between the user's eyes. Such may be the case for a variety of reasons including individual variations in the helmets used, as well as non symmetries of the user's head conformation. In this case, the user of the night vision device will not be able to achieve a completely satisfactory adjustment of the monocular scopes to provide binocular vision and depth perception.

The teaching of the Burbo patent is believed to include the provision of a pair of spherical recesses on a first part of the support structure attached to a helmet. A second part of the support structure is secured to the night vision device and includes a pair of spring-loaded balls respectively receivable into the pair of spherical recesses to pivotally attach and support the night vision device. Electrical contact between the night vision device and its battery pack is made through the engagement of the two parts of the support structure only when the night vision device is pivoted to its use position. Thus, when the night vision device is pivoted upwardly to allow the user unobstructed vision, power supply to the device is interrupted to save energy.

However, the support structure and electrical power interruption features of the Burbo device necessarily result in conduction of electrical power to the night vision device by way of electrical contacts which are exposed. In effect, these exposed contacts are switch contacts because they close and open in response to the pivotal movement of the night vision device between its use and flipped up positions. As a first consideration, such exposed electrical switch contacts are highly subject to damage which can interfere with the conduction of electrical power to the night vision device. Secondly, deterioration of the electrical switch contacts can result from environmental factors. That is, environmental factors may cause corrosion and other deterioration of such exposed contacts, including such undesirable effects as pitting, the formation of nonconductive oxide coatings, and the formation of other films or coatings on the exposed contacts. Of course, all of these environmental effects are detrimental to the reliable conduction of electrical power to the night vision device. The result is that such exposed electrical switch contacts compromise the service reliability of the night vision device, and cause the device to be frail instead of rugged and able to withstand the handling to which such devices are subjected in their use environment.

Another ANVIS type of device which provides a night time view using both of the user's eyes and which provides for individual adjustment of interpupillary distance is seen in U.S. Pat. No. 4,463,252, issued 31 Jul. 1984, to T. M. Brennan, et al, (the '252 patent). However, a night vision device according to the '252 patent includes only a single image intensifier assembly. The view provided to each of the user's eyes is a respective right or left half of the image provided by this singular image intensifier assembly. Consequently, the device according to the '252 patent cannot provide true binocular vision with depth perception.

Yet another conventional binocular night vision device is known as the ANVIS 6 in which a pair of night vision monoculars are suspended in front of the user's eyes by a frame which is rectangular in plan view. The frame is supported from a face plate or helmet which the user wears in order to support the weight of the night vision device. The conventional ANVIS 6 includes an interpupillary distance adjustment mechanism with a pair of transversely aligned rotatable shafts, each drivingly coupled to the other at adjacent ends thereof, and each extending within the rectangular frame above one of the monocular scopes. Each shaft defines a respective thread portion of opposite hand, and the rectangular flame slidably carries a pair of depending monocular mounts each threadably engaging one of the threaded shafts. One of the threaded shafts includes an outwardly projecting knob rotation of which rotates both shafts and simultaneously moves the monocular mounts symmetrically together or apart to adjust interpupillary distance to the preferences of the user.

The conventional ANVIS 6 also includes a tilting mechanism which includes an elongate eccentric bushing device which is rotatable in the rectangular frame. This rotatable bushing carries the threaded shafts of the interpupillary adjustment mechanism, and moves these shaft in an arcuate path to tilt the monocular mounts relative to the rectangular frame about a slide and pivot shaft which is carried also by this frame. With the interpupillary adjustment mechanism of the ANVIS 6, the user is also constrained to a symmetrical positioning of the night vision monocular. Also, each of the monocular mounts must be a separate piece, as are the two threaded shafts. This requirement for separate pieces increases the manufacturing costs of the ANVIS 6, while also increasing the logistics burden for repair and maintenance of the device.

The ANVIS 6 type of binocular night vision devices use a power supply, which is usually a battery pack including several batteries. This battery pack is connected to the device by an electrical cable, and is sometimes mounted to the rear part of the aviator's helmet in order to partially counter balance the weight of the night vision binocular. Alternatively, this battery pack may be carried in the aviator's breast pocket or on the belt of the aviator's pants. Understandably, having an electrical cable extending between this battery pack and the binocular night vision device is itself undesirable. In addition, the battery pack includes several batteries, both to provide the length of operation for the night vision device which is desired, and to obtain the necessary input voltage for the standard image intensifier modules which are used in these devices. Accordingly, the battery pack for the conventional night vision devices is quite heavy.

Further to the above, it should be recalled that the conventional image intensifier tubes used in such night vision devices are ordinarily manufactured in an encapsulating and electrically-insulating module which includes not only the image intensifier tube, but also the necessary kilo-volt power supply circuit for this tube. The kilo-volt power supply is designed to accept a nominal 3 volt input, and to provide various kilo-volt outputs that are connected respectively to various parts of the image intensifier tube to power this tube. Considerations for avoidance of leakage of kilo-volt voltages from the kilo-volt power supply and image intensifier tube so mitigate in favor of such an encapsulated module that this construction has become an industry standard.

U.S. Pat. No. 5,130,527, issued 14 Jul. 1992 to Mark E. Gramer, et al., is known to disclose a monocular type of night vision device in which a single image intensifier tube is powered by a single battery, which may be a single 1.5 volt cell, for example, or which may be a battery of nominally higher voltage (such as a 3.5 volt lithium battery), but which drops below the necessary 3-volt nominal input requirement for the image intensifier tube module during its useful life, by providing a regulated power supply circuit interposed between the battery and the image intensifier tube module. This regulated power supply circuit accepts the lower-voltage input from the battery and provides a regulated 3-volt nominal output to the image intensifier tube module. However, the disclosed device is a night vision monocular scope with only a single image intensifier tube.

Additionally, a consideration with the conventional binocular night vision devices using two monocular scopes is that these scopes must be individually purged of moist air, back filled with dry gas (usually dry nitrogen), and sealed to prevent fogging during cold weather conditions. This requirement represents a considerable design, construction, and operational challenge for the conventional devices, which must also provide for individual electrical power feed into the monocular scopes from an outside power supply. Additionally, the switch and circuitry of the power supply must be individually provided with environmental protection so that the reliability of the device is not compromised by a failure at this portion. Considering all of these factors, the conventional binocular night vision devices using monocular scopes are larger, heavier, and more complex than is desired.

SUMMARY OF THE INVENTION

In view of the deficiencies of the related technology, a primary object for this invention is to provide a binocular night vision device (hereinafter, "BNVD") overcoming one or more of these deficiencies.

An object for the present invention is to provide a multi-purpose BNVD capable of well withstanding harsh environmental conditions and rough use. Such a BNVD utilizes a pair of monocular night vision scopes, in which the night vision monocular scopes are individually adjustable for interpupillary distance relative to the user's head and eyes.

Another objective of the present invention is to provide a BNVD that has a "stand alone" capability, requiring only a single battery (preferably of "AA" size) for its operation and for which a voltage step-up power regulator is contained within the BNVD.

Accordingly, the present invention provides a binocular night vision device including a pair of monocular night vision scopes each having a respective one of a pair of image intensifier tube modules, a central housing portion carrying the pair of night vision scopes, the central housing portion defining an outwardly-opening recess configured to receive a single battery providing the only source of power for the pair of image intensifier tube modules, a single voltage step-up circuit received in the central housing portion receiving power from the single battery at a first voltage and providing power to the pair of image intensifier tube modules at a second regulated voltage typically higher than the first voltage.

More particularly, the present invention provides a binocular night vision device including a pair of monocular night vision scopes each having a substantially closed chamber receiving a respective one of a pair of image intensifier tube modules, a central housing portion carrying the pair of night vision scopes and defining a substantially closed cavity, the central housing portion defining an outwardly-opening recess configured to receive a battery providing power for the image intensifier tube modules, each of the central housing portion and the pair of monocular night vision scopes defining cooperating means both for adjustably connecting one to the other and for communicating the substantially closed cavity with each of the substantially closed chambers.

Still more particularly, the present invention provides a binocular night vision device including a pair of monocular night vision scopes; each monocular night vision scope including one of a respective pair of monocular housing portions each having an objective lens and an eyepiece lens, each defining a substantially closed chamber therein, and each having an outwardly-protruding monocular housing ear defining a singular opening from the substantially closed chamber therein; a pair of image intensifier tube modules received respectively one in each substantially closed chamber of the pair of monocular housing portions: a central housing portion defining an outwardly-opening recess and a substantially closed cavity, the central housing portion further defining a pair of opposite outwardly-extending central housing portion ears, each one of the pair of central housing portion ears defining a respective opening from the cavity and including means for pivotally coupling sealingly with a respective one of the pair of monocular housing portions at the monocular housing portion ear thereof to communicate the cavity of the central housing portion with each substantially closed chamber of the pair of monocular housing portions; a voltage step-up circuit received in the central housing portion cavity for providing power to the pair of image intensifier tube modules, the recess being configured to accept a single battery powering the voltage step-up circuit, and means for electrically connecting power from the battery to each of the pair of image intensifier tube modules via the voltage step-up circuit; whereby the central housing portion both pivotally carries and electrically powers the pair of monocular night vision scopes with pivotal movement of the monocular night vision scopes providing for interpupillary distance adjustment.

In another respect, the present invention provides a method of making a binocular night vision device (BNVD), the method comprising steps of: providing a pair of monocular night vision scopes each having a substantially closed chamber; providing a pair of image intensifier tube modules each received into one of the chambers of the monocular night vision scopes; providing a central housing portion carrying the pair of night vision scopes and defining a substantially closed cavity, defining an outwardly-opening recess on the central housing portion which recess is configured to receive a battery providing power for the image intensifier tube modules; providing each of the central housing portion and the pair of monocular night vision scopes with cooperating means for adjustably connecting one to the other; and providing each of the central housing portion and the pair of monocular night vision scopes with means for communicating the substantially closed cavity with each of the substantially closed chambers of the pair of monocular night vision scopes.

Another aspect of the present invention provides a method of operating a binocular night vision device having a pair of monocular night vision scopes each having an image intensifier tube module and a central housing portion carrying the pair of night vision scopes; the method comprising steps of: providing a single battery; using the single battery as the sole source of power for the BNVD; and providing a single voltage step-up circuit receiving power from the single battery at a first voltage and providing power to the pair of image intensifier tube modules at a second regulated voltage typically higher than the first voltage.

Additional objects and advantages of the present invention will be apparent from a reading of the following description of a particularly preferred exemplary embodiment of the invention taken in conjunction with the following drawing figure, in which:

DESCRIPTION OF THE DRAWING FIGURES

FIG. 1 is a fragmentary perspective view of a human user wearing a military protective helmet with a helmet mount for a night vision device, and upon which is mounted a BNVD embodying the present invention;

FIG. 2 provides a partially exploded perspective view of the BNVD seen in FIG. 1;

Figure 1:
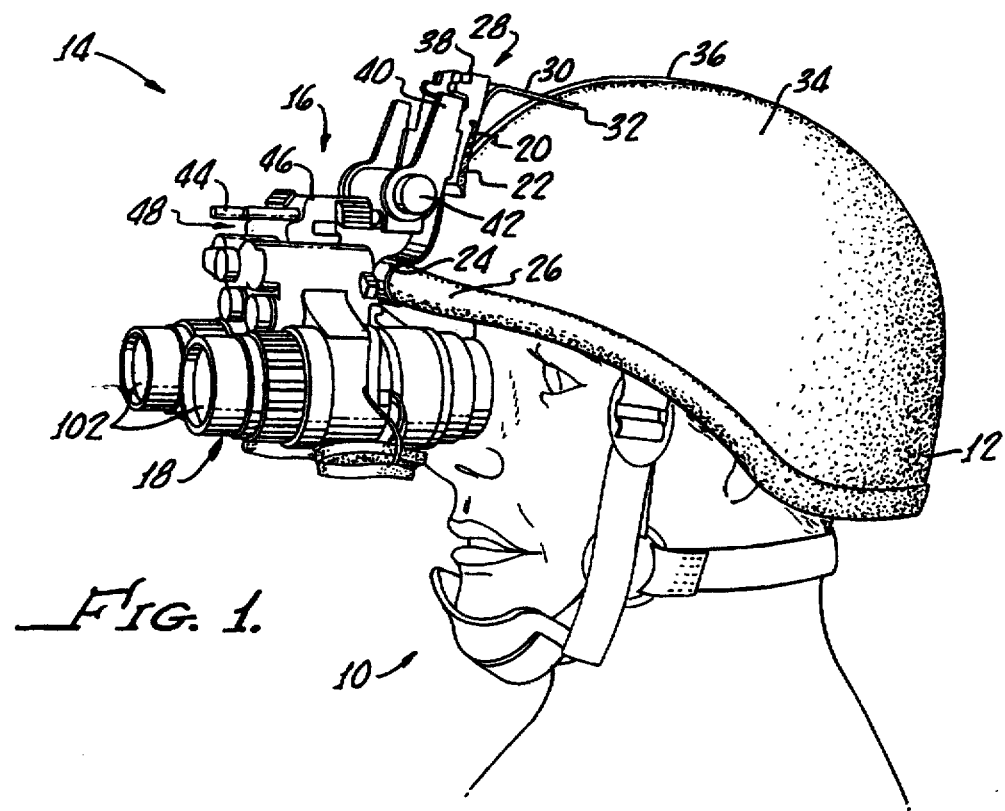
Figure 8:
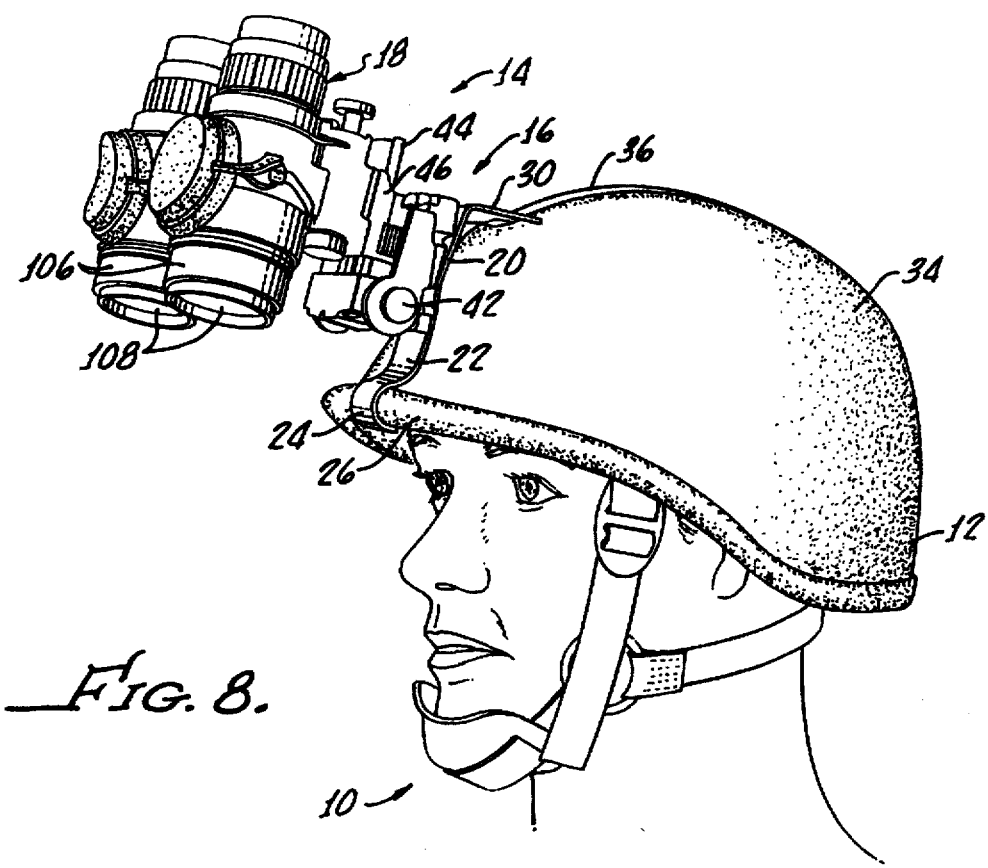
Figure 7:
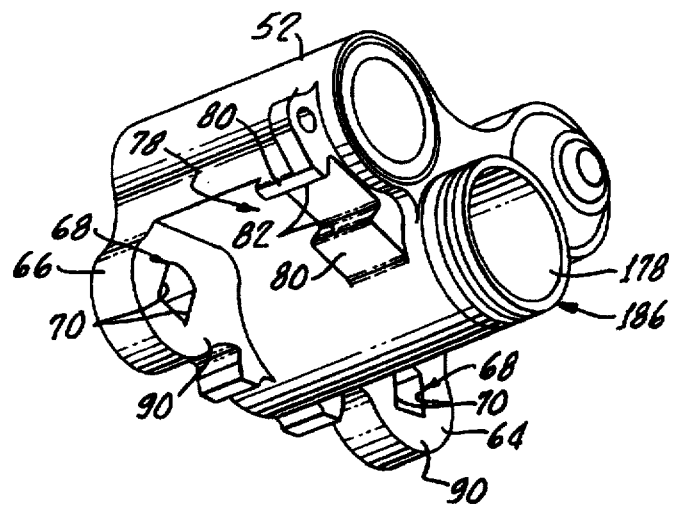
Figure 9:
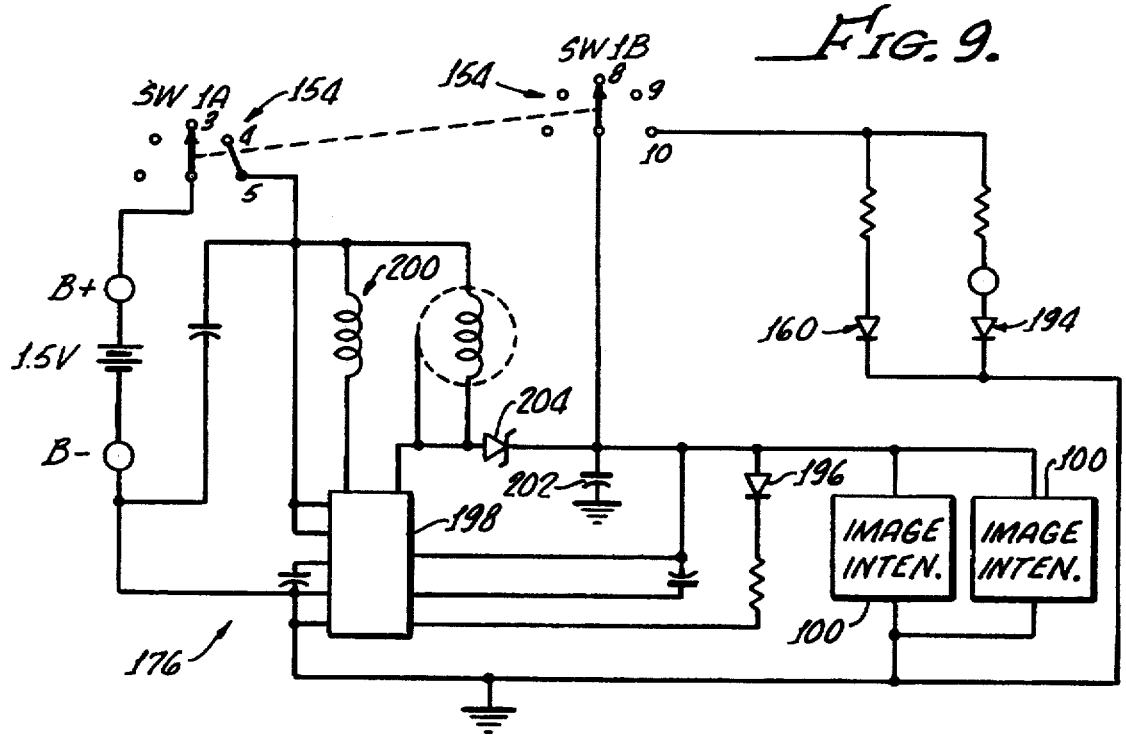

FIG. 7 provides a fragmentary rear perspective view of a portion of the BNVD;

FIG. 8 is a fragmentary perspective view similar to FIG. 1, but with the BNVD flipped up to an inoperative position allowing the user natural vision unobstructed by the device; and FIG. 9 provides an electrical schematic of the operative components of the BNVD seen in the preceding drawing figures.

DETAILED DESCRIPTION OF AN EXEMPLARY PREFERRED EMBODIMENT OF THE INVENTION

FIG. 1 shows a human user 10 wearing a helmet 12. Upon the helmet 12 is mounted a binocular night vision system generally referenced with the numeral 14. The night vision system 14 includes a helmet mount structure 16, and a BNVD 18. The mount structure 16 includes a somewhat L-shaped (although an inverted L-shape as seen in FIG. 1) bracket 20 which at the lower end of its longer leg 22 defines a hook portion 24. This hook portion 24 engages the front brim 26 of the helmet 12. From this brim 26, the longer leg 22 extends upwardly and carries an adjustment structure portion 28, which also provides a flip-up feature, as will be further explained below. A shorter leg 30 of the L-shaped bracket 20 extends rearwardly from the leg 22, and terminates in an edge 32 engaging the forward outer surface 34 of the helmet 12. This leg 30 also attaches to a strap 36 extending rearwardly over the helmet to a hook (not visible in the drawing figures) engaging the rear brim of the helmet. Intermediate of the rear hook and the bracket 20, the strap 36 includes a conventional adjustment buckle (also not seen in the drawing figures'), which may include an over-center feature allowing the strap 36 to be cinched down tightly enough to substantially prevent relative movement between the mount structure 16 of night vision system 14 and the helmet 12.

Further to the above, attention now to FIGS. 1 and 8 in conjunction will show that the adjustment structure portion 28 includes a base part 38 which slidably carries a generally vertically-movable bracket member 40. This bracket member 40 defines a pivot axis, indicated with the dashed line 42, and carries a pair of spaced apart rails 44 which are pivotal about the axis 42 between the deployed position seen in FIG. 1, and the flipped-up position seen in FIG. 8. A carriage member 46 is movably carried on these rails 44, and includes a forwardly-opening receptacle, indicated with the numeral 48, into which a dove-tail mounting plate 50 (best seen in FIG. 2) of the night vision device 18 is receivable. Upon insertion of the dove-tail mounting plate 50 into the receptacle 48, a pawl member carried by the latter engages the former to lock the night vision device 18 on the mount structure 16. The carriage 48 includes a push button disposed between the rails 44, and not visible in the drawing figures, which when pushed by the user 10 releases the dove-tail plate 50 from the receptacle 48, allowing the user to draw the night vision device forwardly out of the carriage 46. Thus, the night vision device 18 is supported on the mount structure 16 with provision for eye relief movement (by for and aft movement of carriage member 46 along rails 44), for vertical alignment with the user's eyes (by vertical relative movement of the bracket member 40 on base member 38, and for flipping up (and flipping down) movements about the axis 42 between the positions seen in FIGS. 1 and 8.

Figure 2:
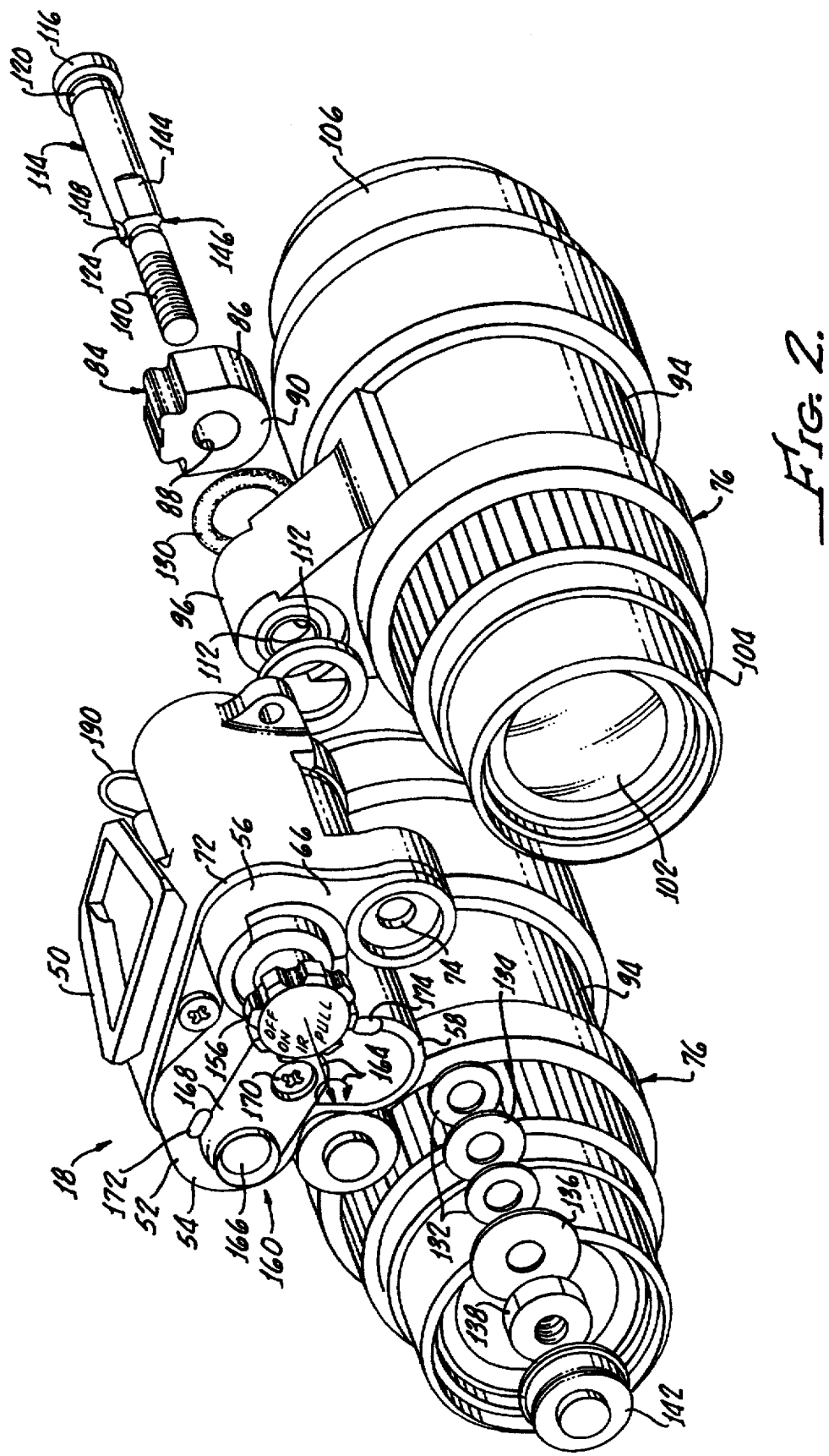
Figure 3:
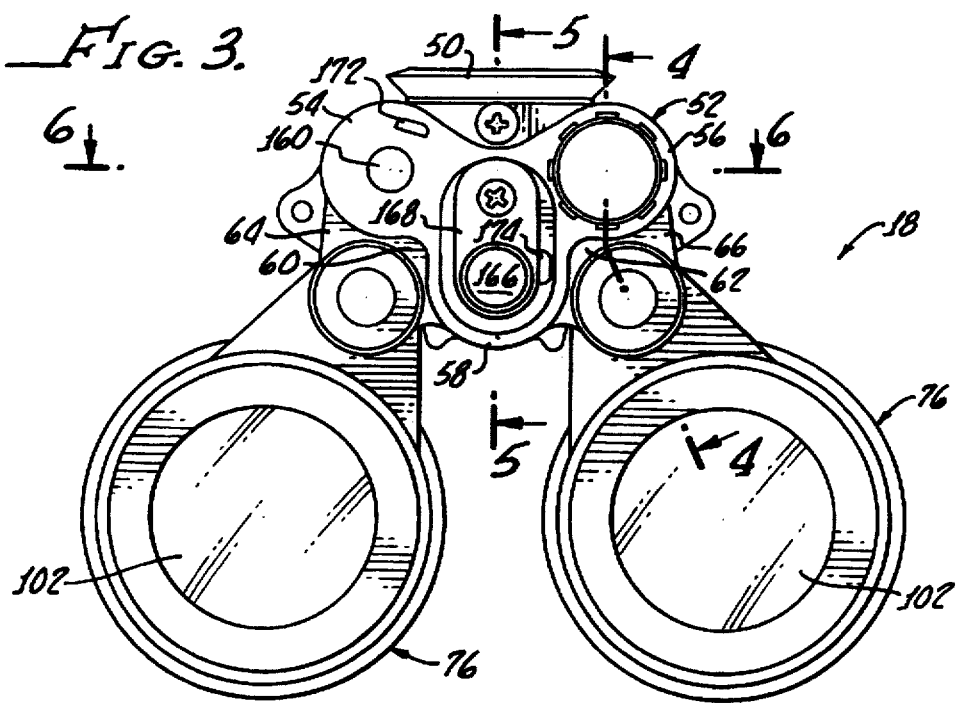
FIG. 3 is a front elevation view of the night vision device seen in FIGS. 1 and 2.

Attention now additionally to FIGS. 2 and 3 in conjunction will show that the BNVD 18 includes a dual-chambered and tri-lobed central housing portion 52, which includes three elongated lobes 54, 56, and 58 extending fore-and-aft of the housing portion 52. As will be seen, the housing portion 52 internally defines two chambers which are sealingly separated from one another. The dove-tail mounting plate 50 is disposed on the top of the central housing portion 52 between the lobes 54 and 56. At respective cusps 60 and 62 between the lobes 54 and 58, and between lobes 56 and 58, the housing portion 52 defines respective depending ear parts 64 and 66. These ear parts 64 and 66 are hollow and communicate in common with the larger one of the internal chambers of the housing portion 52, with the rear wall of each ear defining a slot-like hole 68, best seen in FIG. 7. This slot-like hole includes opposed flat surfaces 70. The front of these ears 64, and 66, as well as the larger chamber of the housing portion 52, is closed by a front wall member 72. At the ears 64 and 66, the front wall member defines a pair of round holes 74 aligning with the slot-like holes 68.

In order to pivotally support one of a pair of night vision monocular scope portions 76 at each of the ears 64, and 66, the central housing portion 52 defines a pair of elongate guide ways 78 (only one of which is visible in the drawing figures, and is best seen in FIG. 7) each aligning with one of the ears 64 and 66, and extending fore-and-aft on the housing portion 52. The pivotal mounting structure for each of the pair of monocular scope portions 76 is that same, so that description of one will suffice to describe both. Viewing FIGS. 2 and 7 in conjunction, it is seen that the guide ways 78 are defined by a pair of opposed depending ribs 80, each having an angulated re-entrant surface 82 confronting the like surface of the opposing rib to cooperatively form a key-stone like cross section for the guide ways 78. Slidably received in each of the guide ways 78 is the key-stone like protrusion 84 of one of a pair of movable knuckle members 86. The knuckle members 86 define a round stepped hole 88 aligning with the slot-like hole 68 and hole 74 of the respective ear 64 and 66. Viewing FIGS. 2 and 7, it is also seen that the ears 64, 66, and respective knuckle members 86 each define a respective one of opposed planar surfaces 90 and 92.

Figure 4:
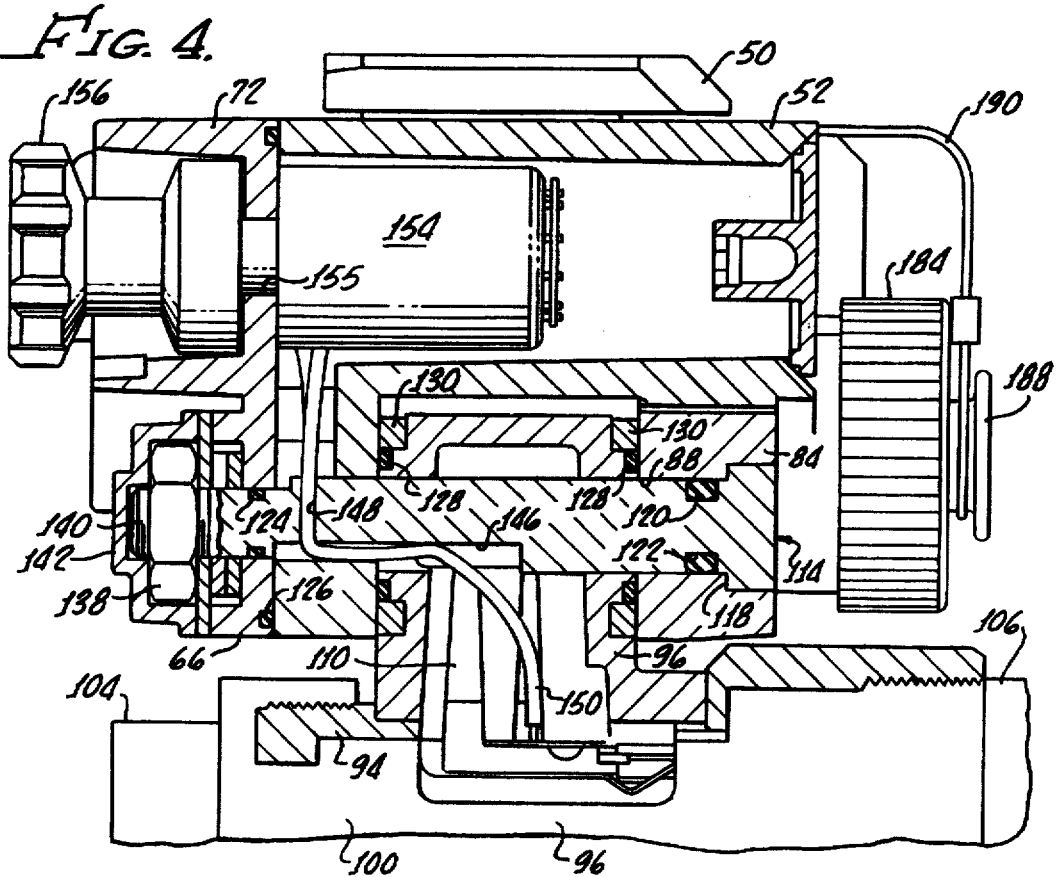
FIG. 4 is a cross sectional view taken at line 4—4 of FIG. 3.
Figure 5:
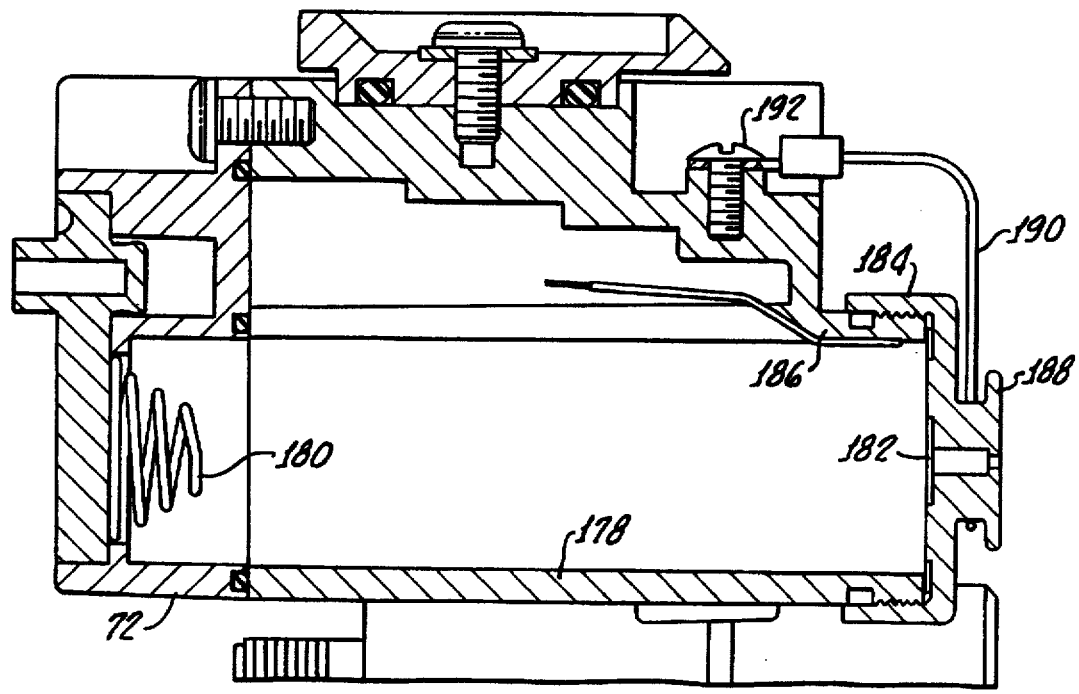
FIG. 5 is a cross sectional view taken at line 5—5 of FIG. 3.

Further considering the night vision monocular scopes 76, and viewing FIGS. 2, 4 and 5 in conjunction, it is seen that each of these monocular scopes includes a generally cylindrical chambered body portion 94, and an outwardly extending hollow ear portion 96. Within the chamber 98 of each monocular scope 76 is disposed an image intensifier tube module 100 (only one of which is visible in drawing FIG. 4). As those ordinarily skilled in the pertinent arts will appreciate, these modules 100 each include an image intensifier tube and a kilo-volt power supply circuit encapsulated together. Forwardly of the image intensifier tube modules 100, each monocular scope 76 includes an objective lens 102 carried movably by a tubular housing portion 104 which is threadably and sealingly carried by the body portion 94. This objective lens 102 allows light from a night time scene to enter the monocular scopes 76 and to be imaged on a photocathode (not seen in the drawing figures) adjacent to the front surface of the module 100. Threaded axial movement of the tubular housing portion 104 relative to the remainder of the body 94 allows focusing of light from a distant night scene on the photocathode of the image intensifier tube module, thereby creating an image of the distant scene. Rearwardly of the image intensifier tube modules 100, each monocular scope body 94 threadably and sealingly carries a cylindrical housing portion 106. These cylindrical housing portions 106 each carry a respective eyepiece lens 108, only one of which is visible in drawing FIG. 7.

Those ordinarily skilled in the pertinent arts will recognize that in response to photons of light being imaged on the photocathode of an image intensifier tube module 100, a shower of photoelectrons is released in a pattern which matches the image. Conventionally, these photoelectrons are proportionally intensified by the use of one or more microchannel plates to produce a much more intense shower of electrons still matching the pattern of the image at the photocathode. The intensified shower of electrons is directed onto a phosphorescent screen within the image intensifier tube, and produces an image in visible light which replicates the image focused at the photocathode. This visible light image is visible through a window at the rear of the image intensifier tube module. The eyepiece lenses 108 project the visible light images from the modules 100 to the eyes of the user 10. Threaded axial movement of the cylindrical housing portions 106 and lenses 108 relative to the remainder of the bodies 94 allows focusing of the projected image to match the vision of the user 10.

Further considering the monocular scopes 76, it is seen in FIG. 4 that the chamber 98 communicates with a passage 110 defined in the ear 96. Further, this passage 110 communicates with a round hole transacting the ear 96. FIGS. 3 and 4 in conjunction show that a stepped and headed pivot shaft member 114 is received in the stepped hole 88 of knuckle member 86, through the hole 112 of the ear 96, and through the slot-like hole 68 and round hole 74 of each of the ears 64 and 66. More particularly, this pivot shaft member 114 includes a head portion 116 which is received into the stepped hole 88 of the knuckle member 86 and engages on a shoulder 118 of this hole. An O-ring sealing member 120 is carried in a groove 122 of the pivot shaft member 114, and sealingly engages the wall of hole 88 in knuckle member 86. Similarly, an O-ring sealing member 124 is carried in a groove 126 of the pivot shaft member 114, and sealingly engages the wall of hole 74 or 76 in the respective ear 64, or 66. At the ear 96 of the cylindrical body 94 of monocular scope members 76, the opposite surfaces are stepped, as can be best seen in FIG. 4. An inner step carries an O-ring sealing member 128, while an outer step carries an polymeric friction washer 130. These polymeric friction washers 130 engage the opposing surfaces of the ears 74, 76, and knuckles 86, as will be further explained.

Viewing FIGS. 2 and 4, and especially FIG. 2, it is seen that forwardly of the ears 75, 76, and on the pivot shaft member 114, a pair of spring seat washers 132 engage the respective ear 74, 76, and sandwich a Belleville spring washer 134, followed by a somewhat larger protective washer 136. These washers are captured on the pivot shaft member 114 by a nut 138 threadably engaging a thread portion 140 of the pivot shaft member 114. Over these washers and nut 138 is received a conformal protective cap member 142. Viewing FIG. 2, it is seen that the pivot shaft member 114 defines a pair of opposed flats 144 (only one of which is fully shown in FIG. 2). The flats 144 engage the flats 70 of slot-like hole 68 so that the pivot shaft member 114 is non-rotational with respect to the central body portion 52.

Thus, it will be appreciated that when the nut 138 is drawn tight on pivot shaft member 114, the belleville spring washer 134 is partially collapsed. This spring washer provides for a nearly constant clamping force on the polymeric friction washers 130 despite thermal expansions and contractions of the various parts when the binocular night vision device 18 is used in differing temperature conditions. Also, it will be understood that the relative movement of knuckle member 86 along guide way 78 allows both the tightening of nut 138 on pivot shaft member 114, as well as the thermal expansion and contraction mentioned above, without these resulting in excessive stresses or strains in the structure of the BNVD 18.

Further to the above, the polymeric friction washers 130 are preferably fabricated of a material providing a dynamic coefficient of friction which is higher than the static coefficient of friction. Preferably, the friction washers 130 are fabricated from a material sold by LNP Engineering Plastics, Inc., under the trade name LubricompOBG. This material is believed to consist of a resin base of polyphenylene sulfide, with an added blend of Teflon (i.e., polytetrafluoroethylene) and silicone, in a particular combination which is proprietary to the material processor. However, the invention is not limited to such particular material, and other materials may be used to form the washers 130 within the scope of the present invention.

Thus, the monocular scopes 76 may be pivotally moved manually relative to the central housing portion 52 individually about a pivot axis defined by the respective pivot shaft member 114 in order to smoothly and precisely adjust the interpupillary distance between these scopes to the individual needs of particular users 10. That is, because the friction washers 130 provide a dynamic friction which is greater than the static friction, and this static friction level is set sufficiently high by pre-load on the Belleville washer 134 to insure that the scopes remain in any pivotal position selected by a user, the tactile impression of pivoting the scopes 76 is very smooth. This action of pivoting the scopes 76 does not include the usual stick-slip action, which could interfere with obtaining a precise match of the interpupillary distance of the scopes and a user 10. Instead, a user of the BNVD 18 is able to obtain a precise interpupillary adjustment. The scopes 76 can be pivoted in response to a sufficiently high manually-applied force level, but stop moving and hold a position as soon as the applied force is below the dynamic friction level.

Still further, viewing FIGS. 2 and 4, it is seen that the pivot shaft member 114, defines an elongate flat 146 extending from a location of alignment with the ear 96 of the cylindrical body portion 94 to a hole 148 which is in alignment with the respective ear 74 or 76 of the central housing portion 52. This flat 146 and hole 148 in conjunction with one another allow an electrical cable 150 to extend from a chamber 152 of the central housing portion through the hole 68 at the ears 64 and 66 and through the hole 148 to pass along the flat 146 and into the ear 96 of the respective monocular scope 76 to the image intensifier tube module, as is seen in FIG. 4. In addition to providing power to the image intensifier tube modules 100, the electrical cables 150 each provide power to a respective light emitting diode (LED) indicator (further described below), which is disposed within each monocular scope 76 in a location in which it is visible though the eyepiece lens 108 when the indicator LED is emitting light. The LED's of the two monocular scopes 76 are of differing colors, and this color difference is essentially the only difference between the scopes 76. As will be further explained, the LED indicators within the monocular scopes are used to signal to a user of the BNVD 18 when a battery powering this device is low, and when an infrared illuminator is in use. The LED's are of differing colors in order to alert the user by color which function is being indicated to the user.

Figure 6:
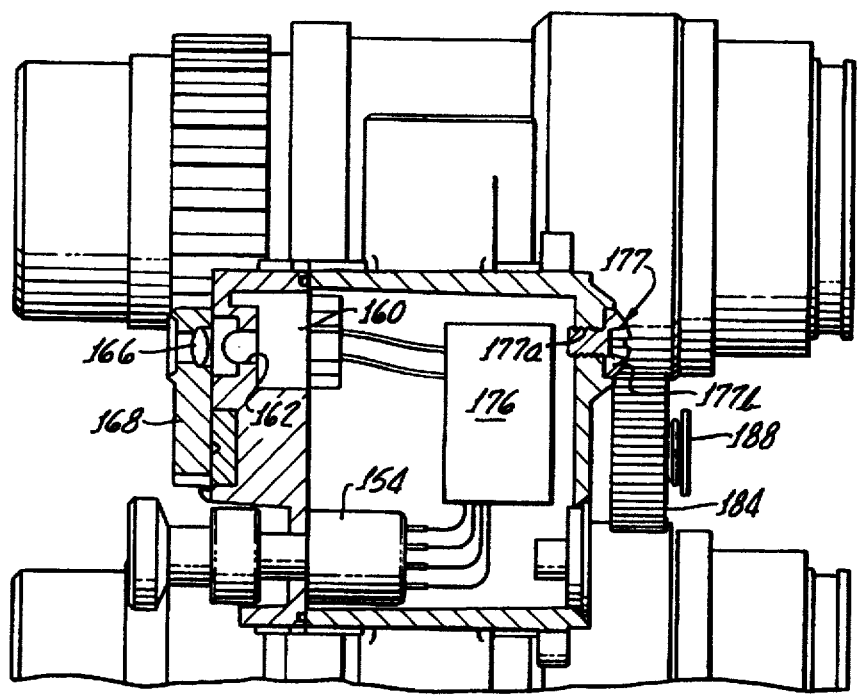
FIG. 6 is a cross sectional view taken at line 6—6 of FIG. 3.

Further considering FIGS. 4, 5, and 6, it is seen that the chamber 152 of central housing portion 52 substantially occupies both of the lobes 54 and 56. As is seen in FIG. 4, the portion of chamber 152 defined within lobe 56 receives a control switch 154. This control switch has a control shaft (not visible in the drawing figures), which sealingly extends externally of the central housing portion 52 via a matching opening 155. This control shaft carries a manually-operable control knob 156, which is seen best in FIGS. 2, 3, and 4. As can be seen marked on the control knob 156 in FIG. 2, and as is illustrated by the arrowed numeral 158 on FIG. 2, successive incremental rotary motions of the switch knob 156 provides for functions of night vision "Off", night vision "On", and night vision "On" with additional infrared (IR) illumination provided by an infrared light emitting diode (LED) 160 (best seen in FIG. 6) sealingly carried by the housing 52 in lobe portion 54 and directed forwardly of the BNVD 18 through a sealed aperture 162. Additionally, as is indicated by arrowed numeral 164 of FIG. 2, an alternative motion of pulling the knob 156 outwardly along the axis of the control shaft of switch 154 and then turning this knob beyond the "night vision On" position to the same rotary position used for "IR On" provides night vision "On, with IR illumination in a locked-on mode". In each case when IR illumination is used, the appropriate indicator LED is illuminated in one of the eyepiece lenses 108 of one of the monocular scopes 76, as will be further explained.

As was mentioned above, FIG. 6 shows the IR illuminator LED 160. FIGS. 2 and 3 additionally show that the central housing portion 52 further carries a spot-light lens 166 in a pivot member 168. The pivot member 168 is secured to the housing 52 by a screw 170 which also defines a pivot axis for this pivot member 168. The pivot member 168 is manually-pivotal between a position as seen in FIG. 2 against a stop lug 172, and an alternative position seen in FIG. 3 against a stop lug 174. When the spot light lens 166 is not in front of the LED 160, this LED emits IR light in a fairly broad cone forwardly of the BNVD 18. This cone of IR illumination allows area illumination and night vision with the BNVD 18 without the need for visible illumination which could reveal the user's location to others. On the other hand, when the spot light lens 166 is moved to the position in front of LED 160, a narrower cone of IR illumination is provided. Thus, the user 10 may use the BNVD 18 for such purposes as map reading without visible illumination, and with a decreased risk of being detected by others who may also have night vision devices.

Further considering FIGS. 4, 5, and 6, it is seen that the other lobe 54 of the central housing portion 52, in addition to housing the illumination LED 160, houses a voltage step-up circuit 176, which is depicted diagrammatically in FIG. 6. This circuit will be further explained below with reference to FIG. 9. In view of the above, it can easily be appreciated that the chamber 152 of the central housing portion 52 is also in fluid flow communication with the chambers 100 of each of the monocular night vision scopes 76. That is, just as the electrical cables 150 extend from the central housing portion 52 into the chambers 100 of the scopes 76, gas can follow this same path, and the BNVD can be purged of moist air and back filled with a dry gas (such as dry nitrogen) and sealed to prevent fogging. This purging and back filing may be accomplished using conventional evacuation and dry nitrogen back filling techniques. Because the monocular scopes 76 communicate with the central housing portion 52, these scopes need not be provided with a purging fixture. Only the central housing portion 52 is provided with such a fixture 177. The fixture 177 consists of a port 177a sealingly receiving a plug member 177b. The sealing relationship of the scopes 76 with the central housing portion 52 and the fluid flow communication of these components with one another insures that the entire BNVD 18 can be purged of moist air and back filled via the open port 177a in a single operation. Thereafter with the plug 177b sealingly closing the port 177a, the BNVD 18 remains free of moisture and fogging during its service life.

FIG. 5 shows that the central housing portion 52 in lobe 58 defines a singular cylindrical battery-recess 178 opening rearwardly on the housing portion 52. This recess 178 is sized to receive either a single single-cell 1.5 volt battery, for example, a single AA-size carbon-zinc or alkaline 1.5 volt single-cell battery, or single similarly sized 3.5 volt lithium battery. At the bottom of the recess 178, which is defined by and within the front wall member 72, is disposed a conical contact spring 180. The other battery contact 182 is carried by a battery cap 184 threadably carried on a threaded boss 186 of housing portion 52. Outwardly, the cap 184 defines a headed protrusion 188 to which is secured one end of a lanyard 190 securing at its other end to the housing portion 52 via a screw 192.

Turning now to FIG. 9, a schematic of an electrical circuit including a battery (indicated by the characters "1.5 V", with its terminals indicated as "B–" and "B+") which is received in recess 178, switch 154 (with two sets of ganged contacts, respectively indicated by "SW1A" and "SW1B"), voltage step-up circuit 176, image intensifier tube modules 100, IR illuminator LED 160, and indicator LED's 194 and 196 is provided. It will be recalled from the description above that the indicator LED's 194 and 196 are of differing colors, and are disposed one in each of the monocular scopes 76 so that they can be seen through the eyepiece lenses 108 when illuminated. The indicator LED's 194, 196 are different colors, and are illuminated to indicate that the illuminator LED 160 is energized, and to indicate that the battery voltage is low so that the battery will soon have to be replaced, as was explained above.

Considering the switch 154, it is seen that the switch contacts numbered 4 and 5 provide for night vision in each of these switch positions. Correlated switch contacts 9 and 10 provide for illumination of the LED's 160 and 194, with the former switch position for IR illumination being of momentary-contact type, and the latter switch position being reached by pulling outwardly on the knob 156 to a locked-on position as was described above. The voltage step-up circuit 176 includes a regulated voltage control IC switching circuit 198. Preferably, the IC circuit 198 is a Maxim DC—DC converter, catalog number MAX 657. This IC circuit 198 switches battery voltage to and from an inductor 200 in order to provide a comparatively high "inductive kick" voltage when battery voltage is removed from the inductor. The voltage from inductor 200 is smoothed and rectified by capacitor 202 and zener diode 204 to produce a nominal 3 volt input voltage for the image intensifier tube modules 100.

In the event that a battery is used which provides more than a nominal 3 volt output, for example, a 3.5 volt lithium battery, then the zener diode 204 will limit the output voltage provided to the image intensifier tube modules 100. Internally, the IC circuit 198 provides a reference voltage, which is applied to diode 196. In the event that battery voltage drops below a certain level, the reference voltage will exceed the voltage being supplied to the image intensifier tube modules 100. In this event, the indicator LED 196 will illuminate to indicate to the user that the battery needs to be replaced.

While the present invention has been depicted, described, and is defined by reference to a particularly preferred embodiment of the invention, such reference does not imply a limitation on the invention, and no such limitation is to be inferred. The invention is capable of considerable modification, alteration, and equivalents in form and function, as will occur to those ordinarily skilled in the pertinent arts. The depicted and described preferred embodiment of the invention is exemplary only, and is not exhaustive of the scope of the invention. Consequently, the invention is intended to be limited only by the spirit and scope of the appended claims, giving full cognizance to equivalents in all respects.

We claim:

1. A binocular night vision device (BNVD) comprising: a pair of monocular night vision scopes each having a respective one of a pair of image intensifier tube modules, a central housing portion carrying said pair of night vision scopes, said central housing portion defining an outwardly-opening recess configured to receive a single battery providing the only source of power for said pair of image intensifier tube modules, said central housing portion and said pair of image intensifier tube modules cooperatively defining a closed chamber separate from ambient and communicating within said central housing portion and said pair of image intensifier tube modules and also sealingly separated from said outwardly-opening recess of said central housing portion, a single voltage step-up circuit received in said central housing portion within said chamber, said voltage step-up circuit receiving power from said single battery at a first voltage and providing power to said pair of image intensifier tube modules at a second voltage higher than said first voltage.

2. The BNVD of claim 1 wherein said battery is a single-cell nominal 1.5 volt battery.

3. The BNVD of claim 2 wherein said battery is a single AA-size battery.

4. The BNVD of claim 1 wherein each of said central housing portion and said pair of monocular night vision scopes defines cooperating structure for adjustably connecting pivotally one to the other.

5. The BNVD of claim 4 wherein cooperating structure for adjustably connecting said central housing portion and said pair of night vision scopes to one another includes said central housing portion defining a pair of outwardly protruding ears, each of said night vision scopes similarly defining a respective outwardly extending ear congruent with a respective one of said pair of ears of said central housing portion, and a pair of pivot shaft members each respectively received through a respective one of said pair of ears of said central housing portion and pivotally extending through the congruent ear of one of said pair of night vision scopes.

6. A binocular night vision device (BNVD) comprising: a pair of monocular night vision scopes each having a respective one of a pair of image intensifier tube modules, a central housing portion carrying said pair of night vision scopes, said central housing portion defining an outwardly-opening recess configured to receive a single battery providing the only source of power for said pair of image intensifier tube modules, a single voltage step-up circuit received in said central housing portion receiving power from said single battery at a first voltage and providing power to said pair of image intensifier tube modules at a second voltage higher than said first voltage; wherein each of said central housing portion and said pair of monocular night vision scopes defines cooperating structure for adjustably connecting pivotally one to the other; wherein cooperating structure for adjustably connecting said central housing portion and said pair of night vision scopes to one another includes said central housing portion defining a pair of outwardly protruding ears, each of said night vision scopes similarly defining a respective outwardly extending ear congruent with a respective one of said pair of ears of said central housing portion, and a pair of pivot shaft members each respectively received through a respective one of said pair of ears of said central housing portion and pivotally extending through the congruent ear of one of said pair of night vision scopes; further including a pair of sealing members each interposed between a respective one of said pair of ears of said central housing portion and the respective ear of a night vision scope, and said pair of pivot shaft members each including sealing means for pivotally and sealingly engaging said ear of the respective one of said pair of night vision scopes, whereby a substantially closed chamber of said central housing portion is communicated via said ears with a substantially closed chamber within each of said pair of night vision scopes.

7. The BNVD of claim 6 wherein said central housing portion defines a singular purge port, and said substantially closed chambers of pair of night vision scopes communicate with ambient only via said singular purge port of said central housing portion, whereby said pair of night vision scopes may be purged of moist air and back filled with dry gas while said singular purge port is open and are sealed from ambient when a plug member is sealingly inserted into said purge port.

8. A binocular night vision device (BNVD) comprising: a pair of monocular night vision scopes each having a substantially closed chamber receiving a respective one of a pair of image intensifier tube modules, a central housing portion carrying said pair of night vision scopes and defining a substantially closed cavity, each of said central housing portion and said pair of monocular night vision scopes defining cooperating means both for adjustably connecting one to the other and for communicating said substantially closed cavity with each of said substantially closed chambers.

9. The BNVD of claim 8 wherein cooperating means for adjustably connecting said central housing portion and said pair of night vision scopes to one another includes said central housing portion defining a pair of outwardly protruding ears, each of said night vision scopes similarly defining a respective outwardly extending ear congruent with a respective one of said pair of ears of said central housing portion, and a pair of pivot shaft members each respectively received through a respective one of said pair of ears of said central housing portion and pivotally extending through the congruent ear of one of said pair of night vision scopes.

10. The BNVD of claim 9 wherein said means for communicating said substantially closed cavity with each of said substantially closed chambers includes a pair of sealing members each interposed between a respective one of said pair of ears of said central housing portion and the respective ear of a night vision scope, and said pair of pivot shaft members each including sealing means for pivotally and sealingly engaging said ear of the respective one of said pair of night vision scopes.

11. The BNVD of claim 8 wherein said central housing portion defines an outwardly-opening recess configured to receive a single battery providing the only source of power for said pair of image intensifier tube modules, a single voltage step-up circuit received in said central housing portion receiving power from said single battery at a first voltage and providing power to said pair of image intensifier tube modules at a second voltage higher than said first voltage.

12. The BNVD of claim 11 wherein said battery is a single-cell nominal 1.5 volt battery.

13. The BNVD of claim 12 wherein said battery is a single AA-size battery.

14. The BNVD of claim 11 wherein said pair of pivot shaft members each define a passage passing an electrical cable between said central housing portion and the respective one of said pair of night vision scopes, said electrical cable carrying electrical power from said single voltage step-up circuit to an image intensifier tube module.

15. A binocular night vision device (BNVD) comprising:
a pair of monocular night vision scopes;
each monocular night vision scope including one of a respective pair of monocular housing portions each having an objective lens and an eyepiece lens, each defining a substantially closed chamber therein, and each having an outwardly-protruding monocular housing ear defining a singular opening from said substantially closed chamber therein;
a pair of image intensifier tube modules received respectively one in each substantially closed chamber of said pair of monocular housing portions:
a central housing portion defining an outwardly-opening recess and a substantially closed cavity, said central housing portion further defining a pair of opposite outwardly-extending central housing portion ears, each one of said pair of central housing portion ears defining a respective opening from said cavity and including means for pivotally coupling sealingly with a respective one of said pair of monocular housing portions at said monocular housing portion ear thereof to communicate said cavity of said central housing portion with each substantially closed chamber of said pair of monocular housing portions;
a voltage step-up circuit received in said central housing portion cavity for providing power to said pair of image intensifier tube modules, said recess being configured to accept a single battery powering said voltage step-up circuit, and means for electrically connecting power from said battery to each of said pair of image intensifier tube modules via said voltage step-up circuit;
whereby said central housing portion both pivotally carries and electrically powers said pair of monocular night vision scopes with pivotal movement of the monocular night vision scopes providing for interpupillary distance adjustment.

16. The BNVD of claim 15 further including a pair of pivot shaft members each respectively received through a respective one of said pair of ears of said central housing portion and pivotally extending through the congruent ear of one of said pair of night vision scopes.

17. The BNVD of claim 16 including a pair of sealing members each interposed between a respective one of said pair of ears of said central housing portion and the respective ear of a night vision scope, and said pair of pivot shaft members each including sealing means for sealingly engaging said ear of said central housing portion and said ear of said night vision scope.

18. The BNVD of claim 15 wherein said recess is configured to receive a single single-cell AA-type battery of nominal 1.5 volt output.

19. The BNVD of claim 18 wherein said recess is configured to receive a single lithium battery of nominal 3.5 volt output as an alternative to said AA-type battery.

20. A method of making a binocular night vision device (BNVD), said method comprising steps of:
providing a pair of monocular night vision scopes each having an image intensifier tube module;
providing a central housing portion, and using said central housing portion to carry said pair of night vision scopes;
providing an outwardly opening battery recess on said central housing portion, which battery recess is configured to receive a single battery providing the only source of power for said pair of image intensifier tube modules; configuring said central housing portion and said pair of monocular night vision scopes to cooperatively defining a closed chamber communicating within said central housing portion and said pair of night vision scopes and separate from ambient and also sealingly separated from said outwardly-opening battery recess of said central housing portion;
providing a single voltage step-up circuit received in said central housing portion and within said chamber and receiving power from said single battery at a first voltage and providing power to said pair of image intensifier tube modules at a second voltage higher than said first voltage.

21. A method of making a binocular night vision device (BNVD), said method comprising steps of:

provuding a pair of monocular night vision scopes each having a substantially closed chamber;

providing a pair of image intensifier tube modules each received into one of said chambers of said monocular night vision scopes;

providing a central housing portion carrying said pair of night vision scopes and defining a substantially closed cavity, defining an outwardly-opening recess on said central housing portion which recess is configured to receive a battery providing power for said image intensifier tube modules;

providing each of said central housing portion and said pair of monocular night vision scopes with cooperating means for adjustably connecting one to the other; and providing each of said central housing portion and said pair of monocular night vision scopes with means for communicating said substantially closed cavity with each of said substantially closed chambers of said of said pair of monocular night vision scopes.

* * * * *